(12) United States Patent
Robert

(10) Patent No.: US 6,278,364 B1
(45) Date of Patent: *Aug. 21, 2001

(54) VEHICULAR DECELERATION WARNING SYSTEM

(76) Inventor: Ivan Robert, Chez Madam Escavi Domaines des Oliviers, 1806 chemis de Vallauris 06600 Antibes (FR)

( * ) Notice: Subject to any disclaimer, the term of this patent is extended or adjusted under 35 U.S.C. 154(b) by 0 days.

This patent is subject to a terminal disclaimer.

(21) Appl. No.: 09/335,835

(22) Filed: Jun. 18, 1999

Related U.S. Application Data

(63) Continuation-in-part of application No. 08/824,403, filed on Mar. 26, 1997.

(51) Int. Cl.⁷ .................................................... B60Q 1/50
(52) U.S. Cl. .......................... 340/467; 340/463; 340/464; 340/469; 340/466
(58) Field of Search .................................. 340/467, 463, 340/464, 469, 466

(56) References Cited

U.S. PATENT DOCUMENTS

| | | | |
|---|---|---|---|
| 3,794,972 | * 2/1974 | Van Ostrom | 340/62 |
| 4,357,594 | * 11/1982 | Ehrlich et al. | 340/72 |
| 4,841,276 | * 6/1989 | Abel et al. | 340/466 |
| 5,231,373 | * 7/1993 | Freeman et al. | 340/469 |
| 6,020,814 | * 1/2000 | Robert | 340/467 |

* cited by examiner

Primary Examiner—Daniel J. Wu
Assistant Examiner—Tai T. Nguyen
(74) Attorney, Agent, or Firm—Kean, Miller, Hawthorne, D'Armond, McCowan & Jarman, LLP

(57) ABSTRACT

A passive warning system for communicating vehicular deceleration and other information through a warning light. A microprocessor-based warning system according to the invention accounts for variations in vehicular speed in generating a warning signal having an intensity level and a blinking rate related to the rate of deceleration of the automobile, the ambient driving conditions and the speed of the automobile. The microprocessor is also programmed to measure speed variations more frequently as the speed of the vehicle increases, allowing information to be communicated in a timely manner. In one embodiment of the invention, the microprocessor is programmed to maintain the highest intensity warning signal activated for a predetermined period of time in order to inform other vehicles of an earlier speed reduction. Further, a warning system according to the invention can be configured to communicate a high intensity warning signal if the wheels of the vehicle become suddenly blocked or rotate at a rate that is disproportionate to the speed of the vehicle. Various other features and embodiments are encompassed within the scope of the intervention.

26 Claims, 12 Drawing Sheets

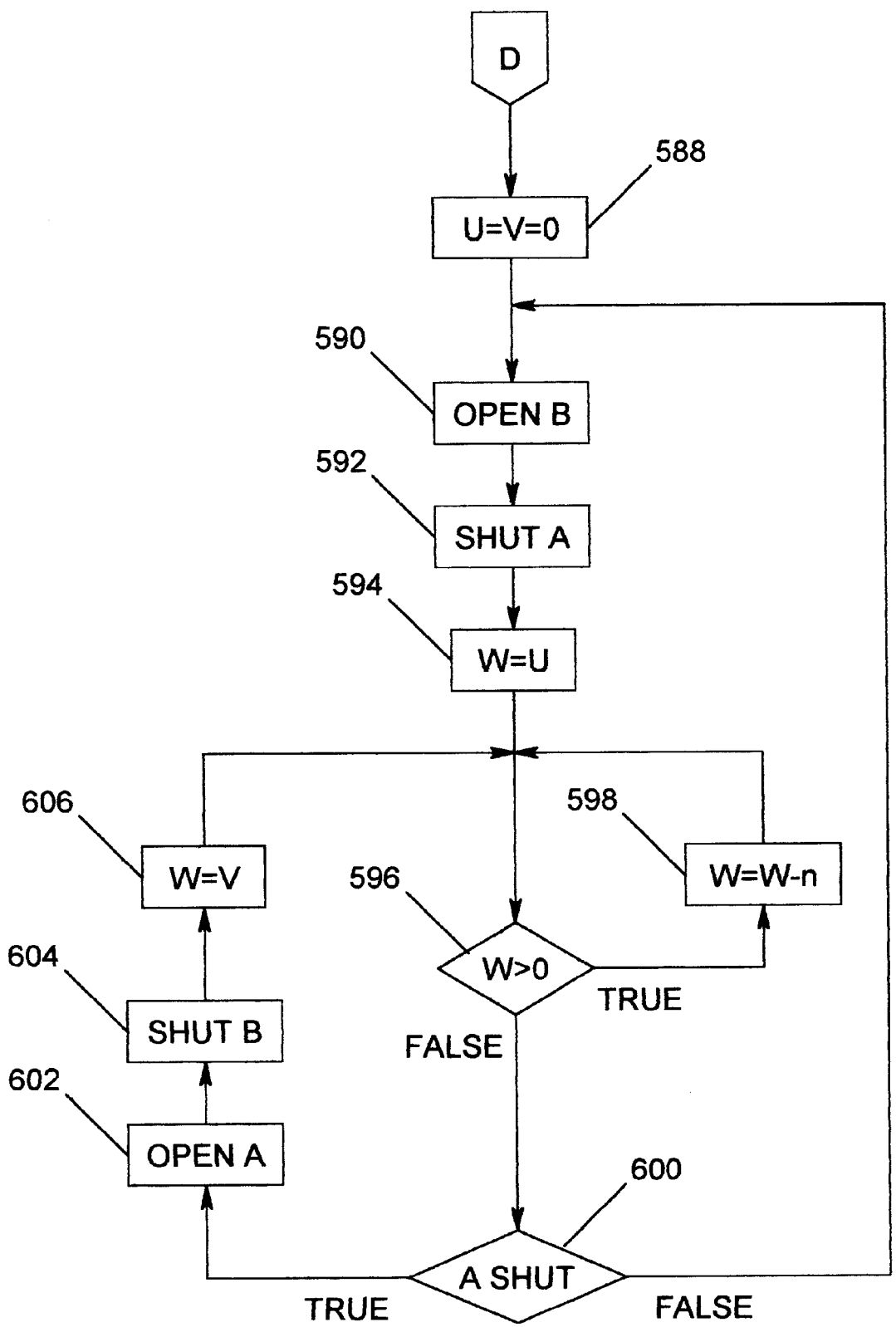

VEHICULAR DECELERATION WARNING SYSTEM

CROSS-REFERENCE TO RELATED APPLICATIONS

This is a Continuation-In-Part of U.S. patent Ser. No. 08/824,403, filed on Mar. 26, 1997.

BACKGROUND OF THE INVENTION

1. Field of the Invention

The present invention relates to automotive warning systems, and more particularly to a microprocessor-based visual warning system that accounts for variations in vehicular speed in providing a variable warning signal to trailing vehicles.

2. Description of the Related Art

Drivers of automobiles have two main methods of communicating their presence and intentions to one another—by audible means such as a horn and by visual means such as lights. The horn allows a driver to communicate with other drivers and pedestrians who may not be in visual contact. Lights allow drivers to visually inform others of their presence and intentions.

Automobiles typically incorporate a variety of lights, with most operating in pairs. Lights used to send specific information or perform other functions are customarily placed at the front, back and sides of an automobile. For example, turning lights can be activated prior to a change in direction; emergency flashing lights are used to apprise others of hazardous conditions or as a distress signal; headlights with low and high beams are used primarily to allow the driver to see and be seen at night; back-up warning lights are used to inform following drivers of backing activities, and finally brake lights warn drivers of a braking event.

The standard lights described above can be divided in two groups depending on how they are operated. The first group includes lights actively operated by the driver to send specific information to other drivers or to operate in a particular environment (e.g. darkness). This group is comprised of turn signal lights, emergency flashing lights, parking lights and headlights. A second group includes those lights that are passively activated by the driver. Such lights are switched on and off automatically in response to particular vehicular operations. Back-up lights and brake lights (including any center-mounted rear brake light) are included in this second group of lights. Passive lights are capable of providing limited information simultaneous with the occurrence of specified operations. Generally, the brake lights are simply illuminated when pressure is applied to the automobile's brake pedal—the brake lights do not provide any information regarding the magnitude of speed variations, nor do they provide any information regarding the speed and ambient driving conditions at which a speed variation is experienced.

There are known prior art warning light systems that disclose various light warning systems. For example, U.S. Pat. No. 3,760,353 to Blomenkamp et al. describes a signal light that flashes after a predetermined level of deceleration is measured. Similarly, U.S. Pat. No. 4,355,594 to Ehrlich et al. describes a hazard warning indicator that is energized to a magnitude that is proportional to the degree of deceleration of a vehicle or to another measurement such as brake pressure; U.S. Pat. No. 5,481,243 to Lurie et al. describes dual audio and visual indicators that depend on differential vehicular deceleration measurements; U.S. Pat. No. 4,952,909 to Woerner et al. describes an early warning system for anticipating vehicle braking by monitoring depression of the vehicle's accelerator; and U.S. Pat. No. 5,231,373 describes a signal light source with an intensity level that varies as a function of at least one safety affecting parameter and a time-varying function compensating for physiological inability to perceive certain changes in intensity levels.

These systems suffer from major shortcomings. For instance, the intensity or frequency of warning signals is the same for a given rate of change in speed (i.e. acceleration or deceleration), regardless of a vehicle's actual speed. In addition, these systems largely ignore ambient driving conditions in calculating the intensity of a warning signal.

OBJECTS OF THE INVENTION

It is an object of the present invention to provide a warning signal which can vary with both intensity and frequency in relation to the a vehicle's rate of change in speed.

It is another object of the present invention to provide a warning signal which takes into account the ambient driving conditions.

SUMMARY OF THE INVENTION

A vehicular deceleration warning system is provided. The main elements of the system are a visual warning element, a microprocessor element, a sensing element, a reset device, and a device which makes contact with the accelerator pedal of the vehicle. The sensor element senses the speed of the vehicle and sends signals to the microprocessor element containing the speed information. The microprocessor determines the acceleration of the vehicle, and sends an appropriate signal to the visual warning element. The microprocessor is also in electronic communication with the reset device and the accelerator pedal contact.

BRIEF DESCRIPTION OF THE DRAWINGS

A better understanding of the present invention can be obtained when the following detailed description of the preferred embodiment is considered in conjunction with the following drawings, in which:

FIGS. 5A–5D are flowchart diagrams depicting operation of a warning system in accordance with the present invention.

DETAILED DESCRIPTION OF THE INVENTION

Figure 1:
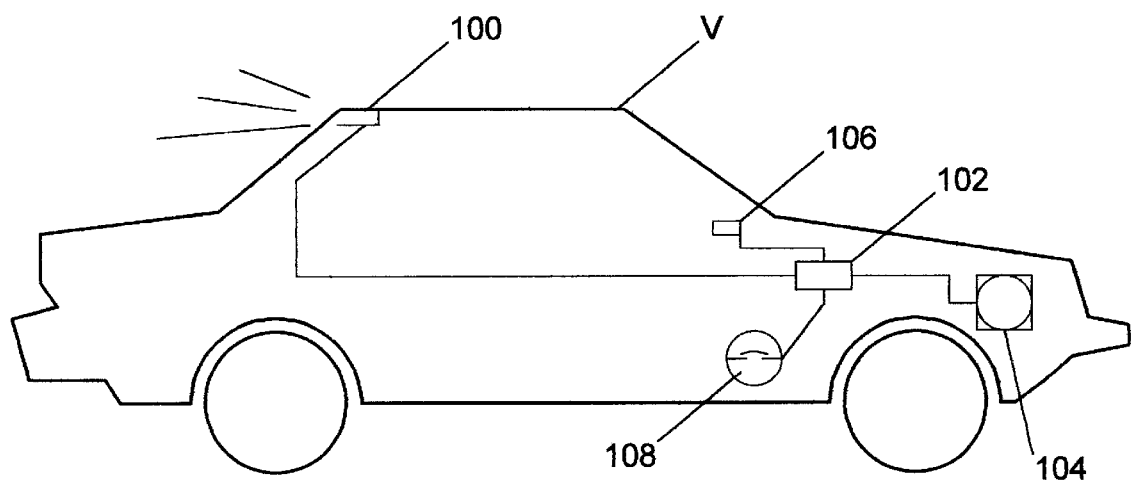
FIG. 1 depicts an automobile incorporating a warning system according to the present invention.

Turning now to the drawings, FIG. 1 depicts an automobile V incorporating a warning system according to the present invention. The warning system is comprised of five main components: a visual warning device 100, a microprocessor card 102, a sensor 104, a reset button 106, and a gas pedal contact 108. The warning system can be installed in all types of vehicles including: motorcycles, cars, trucks, buses, snowmobiles and other off-road vehicles.

Figure 2:
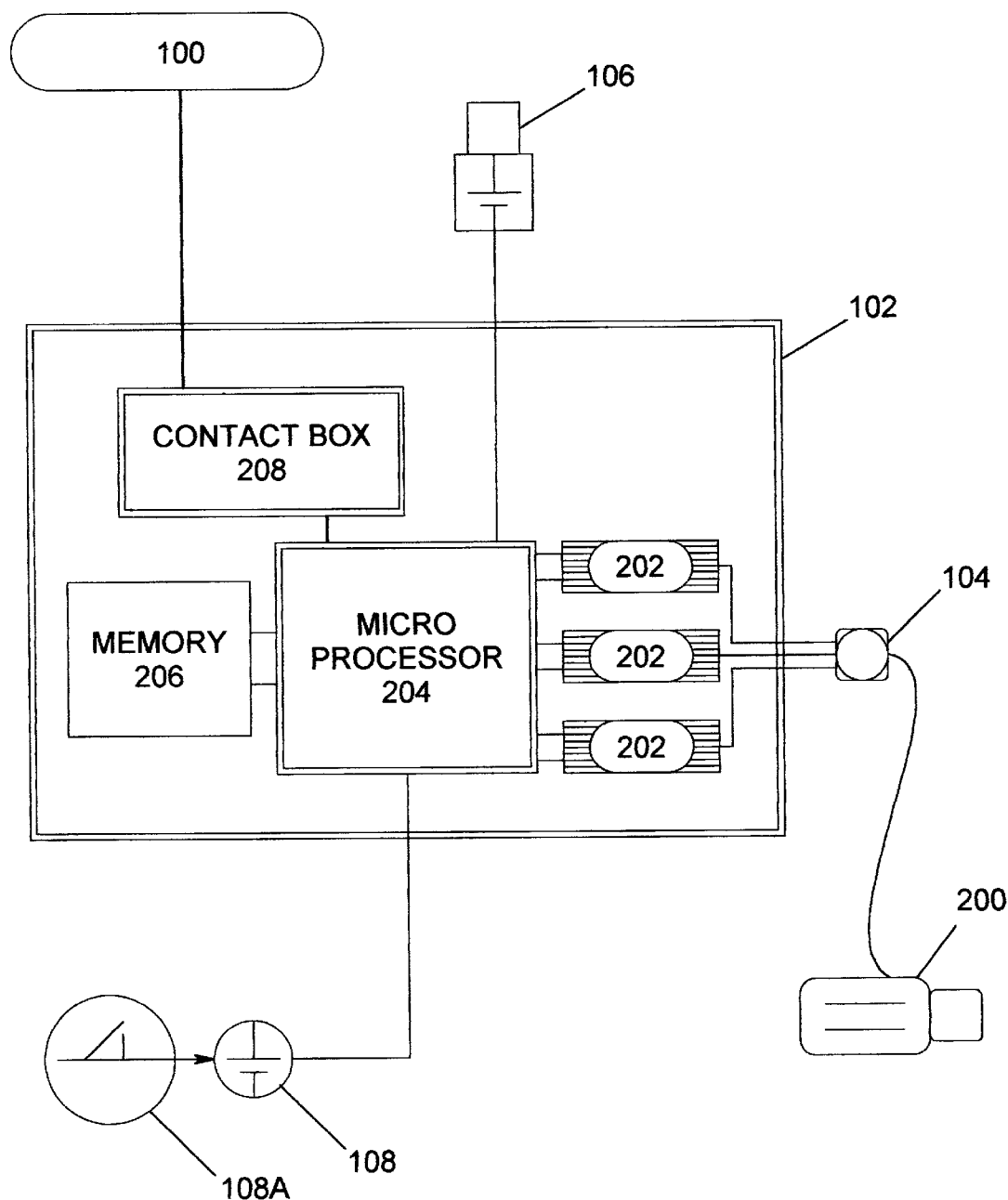
FIG. 2 is a block diagram of a warning system according to the present invention.
Figure 3:
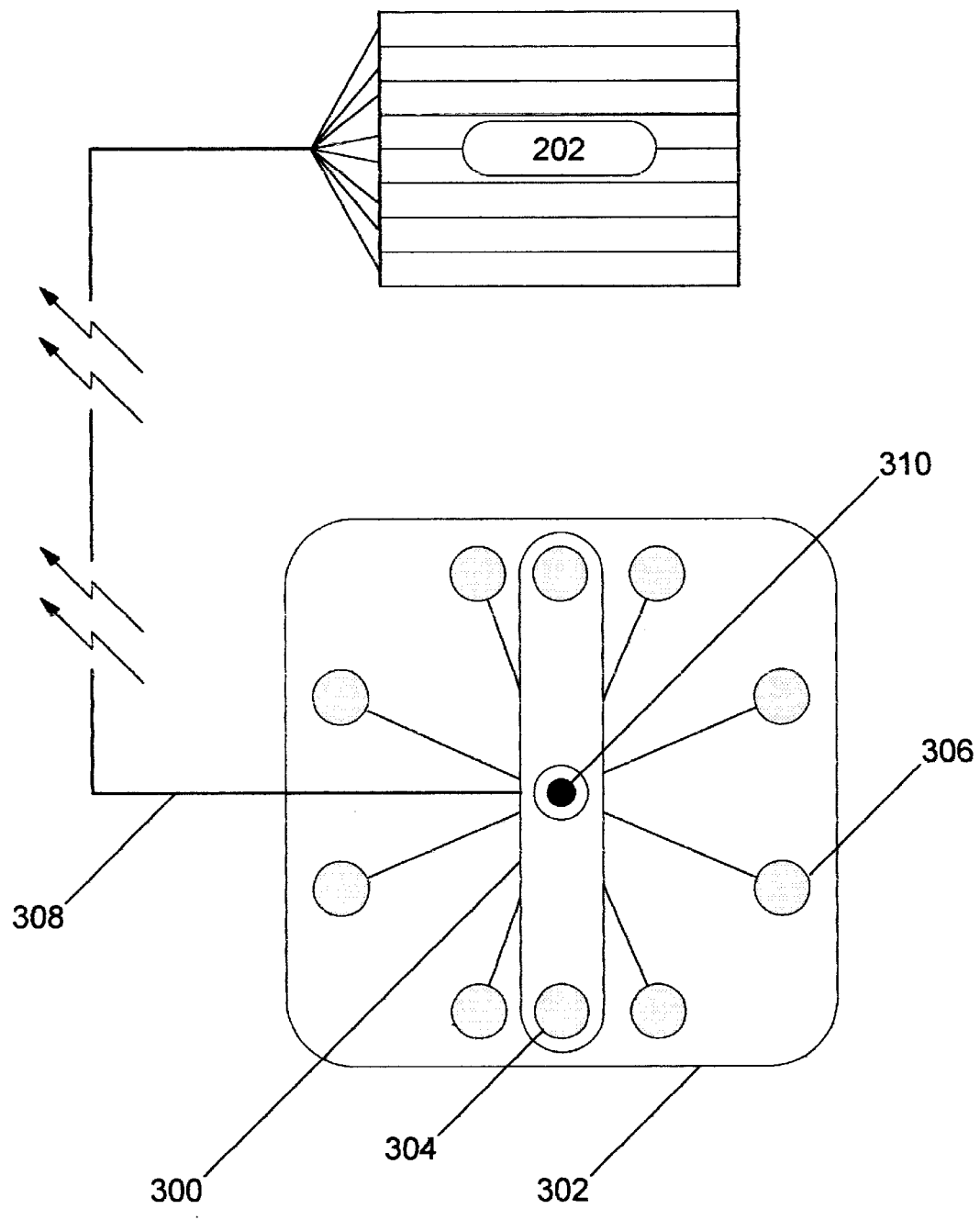
FIG. 3 is a top view of a sensor, coupled to a set of binary meters, for use in a warning system according to the present invention.

The visual warning device 100 of the disclosed embodiment is a signal light. The sensor 104 of the disclosed embodiment is a relatively simple device used to generate electrical pulses that correspond to revolutions of the wheels of the automobile V. These electrical pulses are communicated to one or more sets of binary meters 202 (FIG. 2 shows three sets of eight binary meters 202) installed on the microprocessor card 102 to be used in calculating a speed value in order to detect a deceleration of the automobile V. An exemplary embodiment of the sensor 104 is shown in FIG. 3, while calibration of the sensor 104 is discussed in conjunction with FIGS. 5A–5D.

The microprocessor card 102 incorporates the components of the system used to select different warning intensity levels and to communicate with the visual warning device 100. In addition to the sensor 104, the microprocessor card 102 receives signals from the reset button 106 and from the gas pedal contact 108.

The microprocessor card 102 can be placed anywhere in the automobile V, but is preferably located out of sight where it will not be accidentally disturbed. In the disclosed embodiment of the invention, the visual warning device 100 is placed at the back of the automobile V, well in sight of the following drivers, and may take the place of a rear-mounted brake light. The reset button 106 is placed in the cab of the automobile V, within reach of the driver. The reset button 106 may be configured to flash and/or beep when the microprocessor card 102 needs to be manually reset. The gas pedal contact 108 is utilized to detect pressure on the gas pedal 108A (FIG. 2). The warning system is preferably powered by the automobile's battery (not shown).

Referring more specifically to FIG. 2, a simplified block diagram of a warning system according to the present invention is shown. The sensor 104 is coupled to a drive shaft, cable or gear box 200 (in manner similar to a speedometer connection) and to the microprocessor card 102. While the automobile V is moving, the sensor 104 transmits pulses to the binary meters 202. In addition to the binary meters 202, the microprocessor card 102 incorporates the microprocessor 204, the memory 206 and the contact box 208.

Each binary meter 202 installed maintains a running total of pulses received until cleared by the microprocessor 204. As described below, the microprocessor 204 reads and resets the binary meters at a rate that increases with the automobile's speed. When more than one set of binary meters are installed, the microprocessor 204 reads each set of binary meters at regular intervals of time. The memory 206 is used to store variable values and instructions directing the microprocessor 204 to perform operations and calculations such as those depicted in FIGS. 5A–5D. It is also contemplated that the microprocessor 204 and the memory 206 could be integrated on a single integrated circuit (IC). The gas pedal contact 108 is installed under the gas pedal 108A or under the automobile's hood, and is configured to communicate a signal to the microprocessor 204 when pressure is applied to the gas pedal 108A.

The microprocessor 204 is coupled to a contact box 208. The contact box 208 is coupled to the visual warning device 100. The contact box 208 incorporates wires and contacts for selection and activation, by the microprocessor 204, of specified lights of the visual warning device 100. Further, to better attract people's attention when the automobile V is involved in an accident, the highest warning intensity level can be combined with activation of the automobile's hazard lights. The connection to the hazard lights is not shown.

The present invention is capable of processing data regarding an automobile's speed and rate of deceleration to warn other drivers, within a few tenths of a second, when a predetermined and potentially dangerous rate of deceleration is detected. The warning system thereby allows other drivers to react in a timely fashion and avoid preventable collisions.

To be effective, however, the warning signal should remain simple and easy to understand, and is ideally not subject to different interpretations. For example, if the warning signal is an increase in light intensity which corresponds to an increase in the deceleration rate, the warning signal may be seen and interpreted differently by the different drivers, and precious tenths of a second may be wasted in determining the magnitude of impending danger. Variations in light sources (i.e., different sizes and shapes of lights), ambient light and weather conditions, and distance, all serve to reduce the desirability of using light intensity variance as a warning signal. For this reason, the warning signal of the preferred embodiment is the flashing of the light(s). Flashing signals are used all over the world to attract people's attention and signal danger. Police cruisers, ambulances, fire trucks, tow trucks, and even airplanes and helicopters all utilize flashing devices or strobes to alert others to their presence.

In the event the warning system of the present invention is integrated with a braking system (for instance, if the visual warning device 100 replaces a standard rear-mounted brake light), it is desirable that any control signals communicated to the visual warning device 100 have priority over normal brake signals. When activated, standard brake lights do not always indicate that the automobile V is decelerating. In fact, the automobile V could be accelerating while pressure is applied on the brake pedal and brake lights are activated (e.g., the automobile is traveling down a steep incline). Likewise, the automobile V experiences periods of deceleration with no pressure being applied on the brake pedal and, consequently, no activation of the brake lights (e.g., the automobile V is traveling up a steep incline). It is therefore desirable that normal brake light signals and the warning signals of the present invention remain distinct. In this manner, other drivers can remain informed of the intensity of any speed reduction experienced by the automobile V regardless of any braking signals.

Turning now to FIG. 3, details of a sensor 104 for use in a warning system according to the present invention are provided. The sensor rotating part 300 is finger-like shaped. The fingers of the rotating part 300 are pointing out from an axis of rotation 310. In the disclosed embodiment of the invention, the rotating part 300 is composed of two fingers pointing out in opposite directions. The axis of rotation 310 crosses the center of the rotating part 300 (i. e., the base of the fingers), perpendicularly to its plan. A rotating magnet 304 is fixed at the tip of each finger of the rotating part 300. The rotating part 300 and rotating magnets 304 are disposed within a frame 302. A number of fixed magnets 306 are disposed in circle within the frame 302. The disclosed embodiment of the invention incorporates 8 fixed magnets. Each binary meter of a set of binary meters 202 is coupled to at least one fixed magnet 306. When the automobile V is in motion, a driver causes the sensor rotating part 300 to rotate relative to motion of the wheels of the automobile V. The sensor driver can be any type of shaft, cable, or gear (not shown). The sensor 104 can be mounted, via an adapter, to a speedometer driver. The construction of the sensor driver and speedometer driver is not considered critical to the invention and can be of any type as known to those skilled in the art.

Rotation of the sensor rotating part 300 causes the rotating magnets 304 to pass in close proximity to the fixed magnets 306. Each time one of the rotating magnets 304 passes one fixed magnet 306, an electrical pulse is induced. The induced electrical pulses are communicated to the set of binary meters 202 via wires 308. In the disclosed embodiment of the invention, the set of binary meters 202 is comprised of 8 binary meters. Each binary meter of a set of binary meters 202 maintains a running total of the pulses received from at least one fixed magnet 306 until it is reset, at which point it begins maintaining a new running total of pulses.

Many alternate embodiments of the sensor 104 are possible. For example, on many types of automobiles, the speedometer is not driven by a cable. Instead, a sensor installed in the automobile's gear box is used to produce an electrical current that is communicated to the speedometer. The intensity of the electrical current increases as the speed of the vehicle increases, with variations being reflected in the miles per hour or kilometers per hour of the speedometer. A meter reads the electrical current intensities generated by the sensor and attributes a value to this electrical intensity to determine a variation in the automobile's speed. The scope of the present invention is not considered to be limited by a specific implementation of the sensor 104, and variations in the implementation of the sensor 104 do not significantly impact operation of the warning system.

Figure 4A:
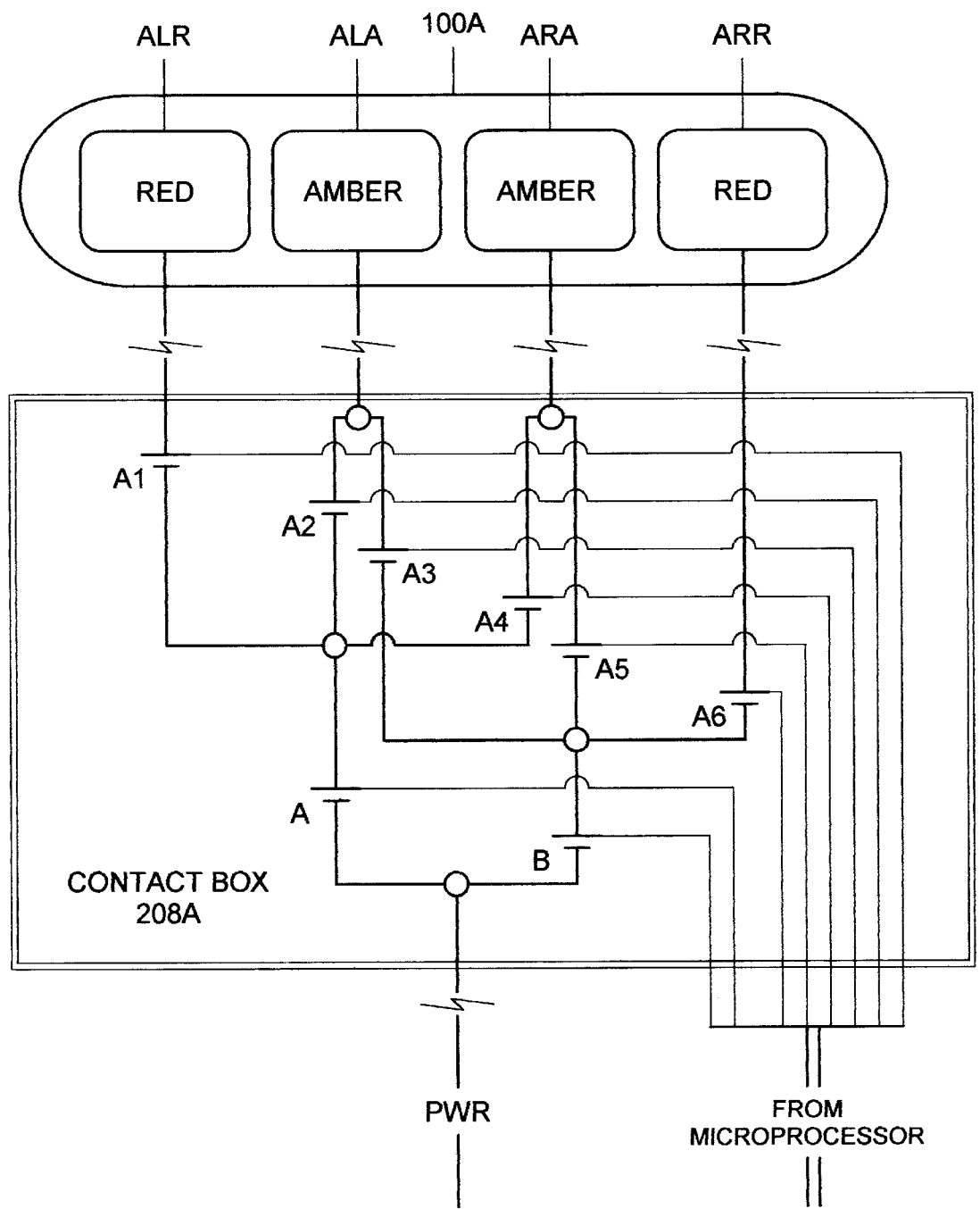
FIGS. 4A–4E are designs of a visual warning device, and the corresponding operating contacts, for use a in a warning system according to the present invention.
Figure 4B:
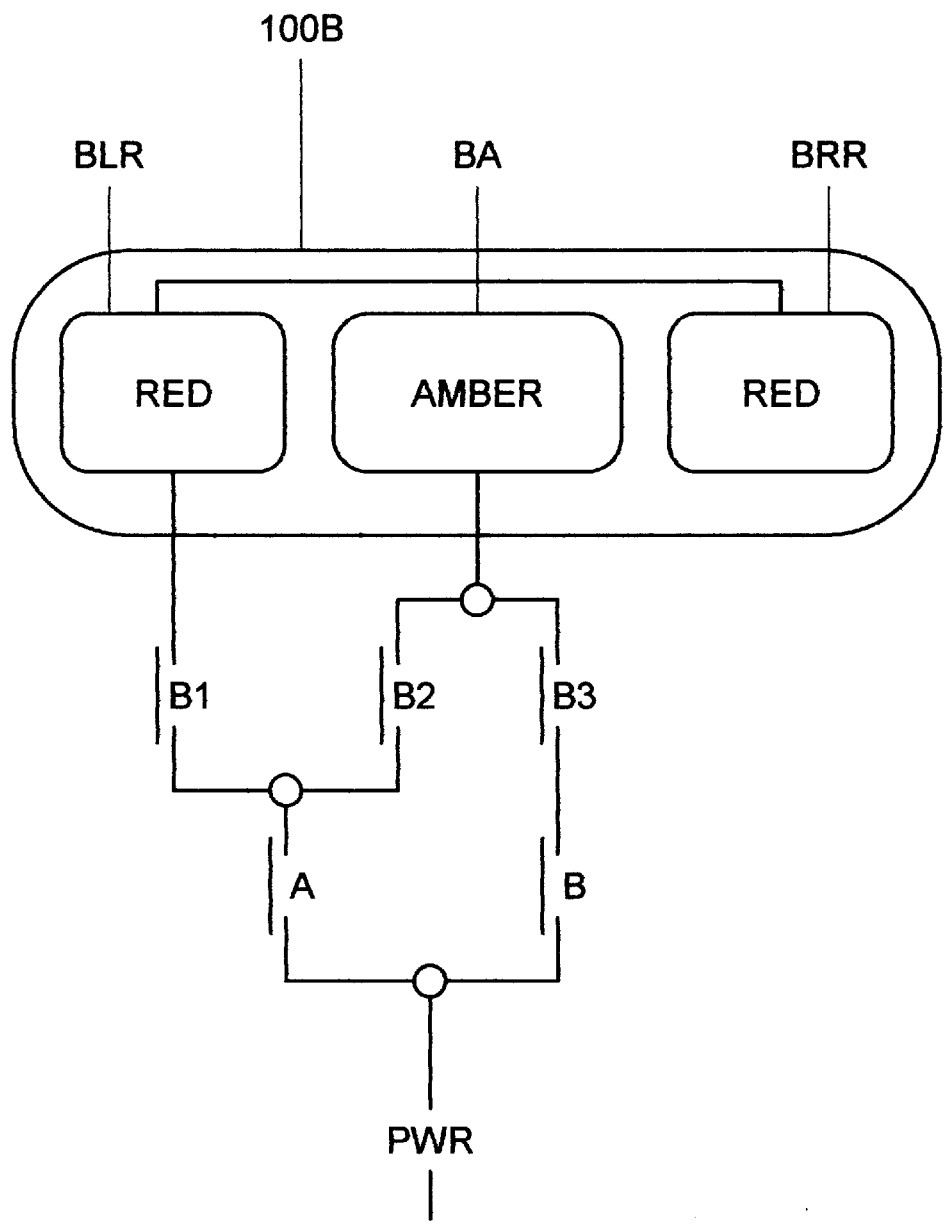
Figure 4C:
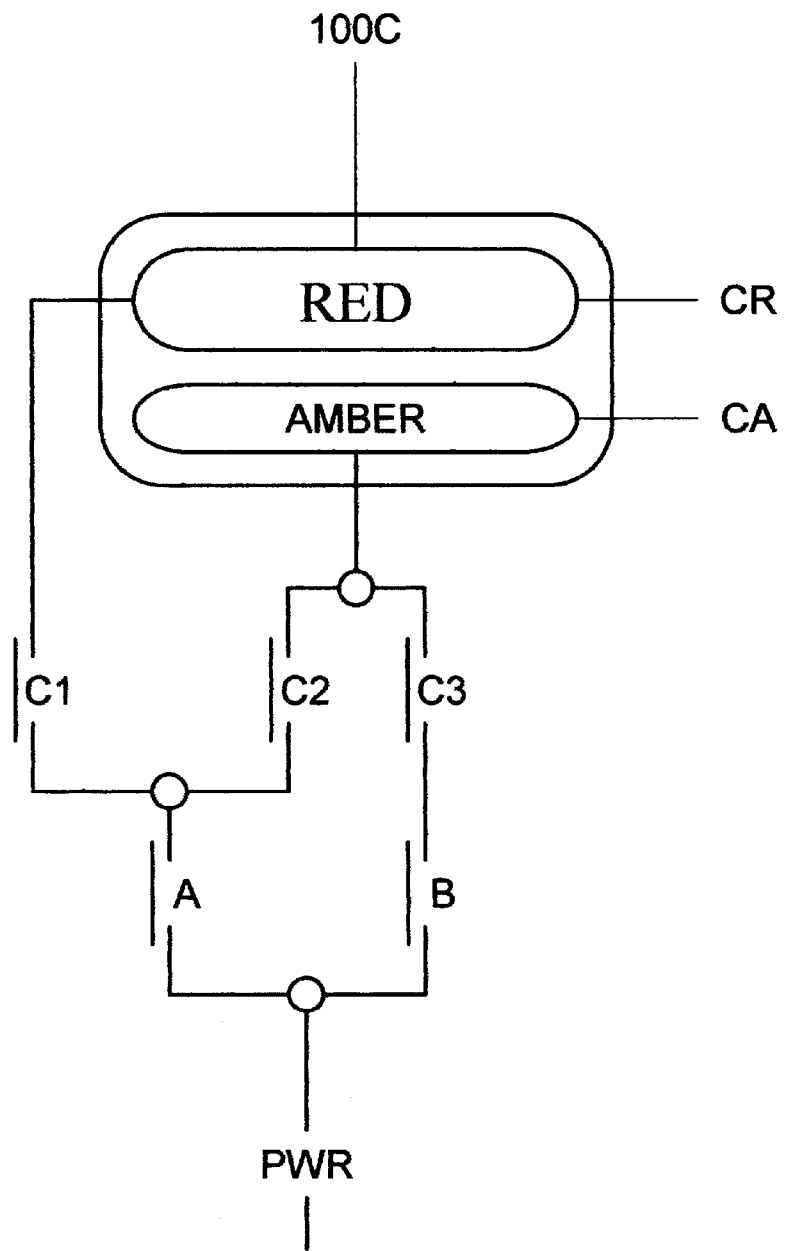
Figure 4D:
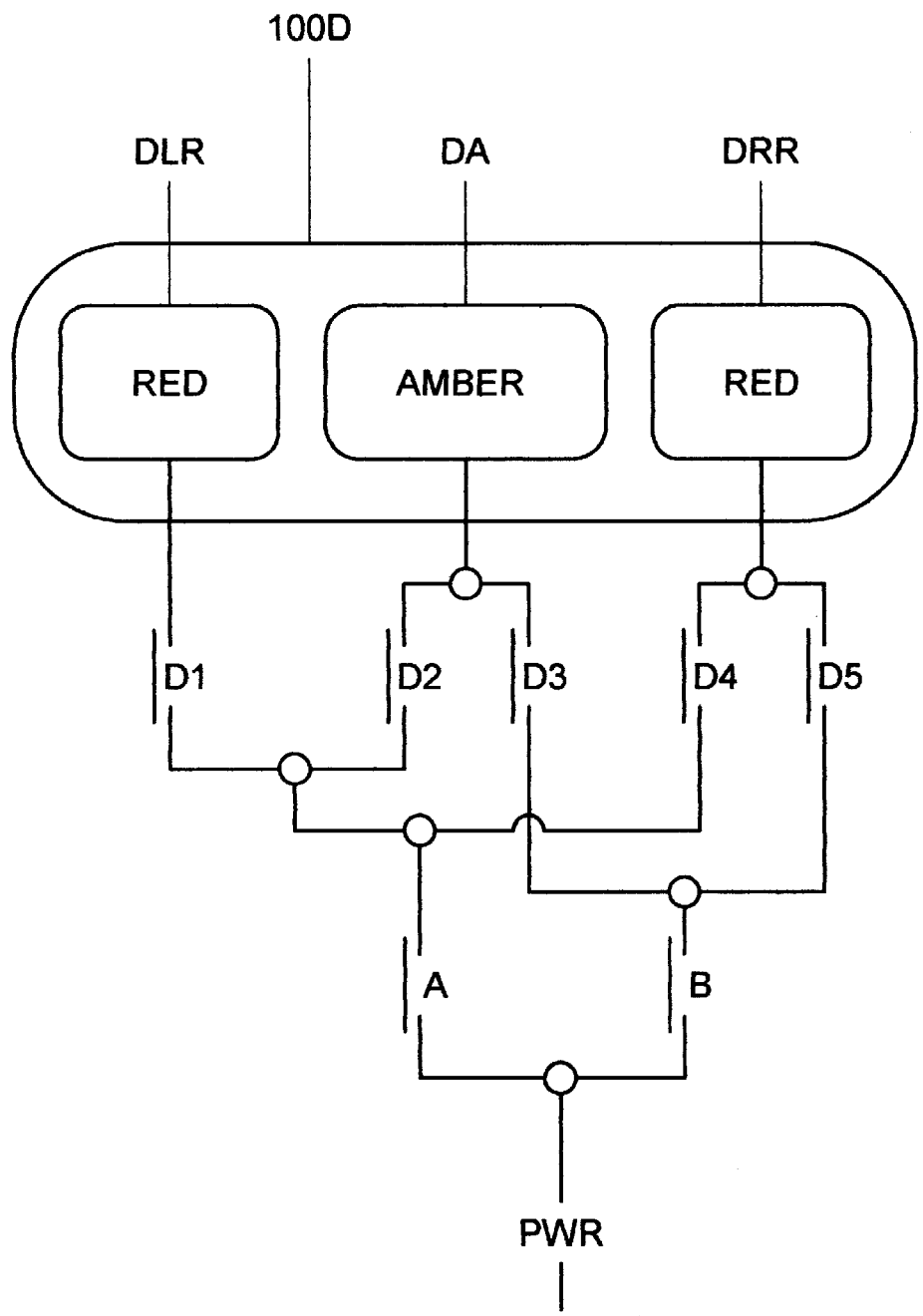
Figure 4E:
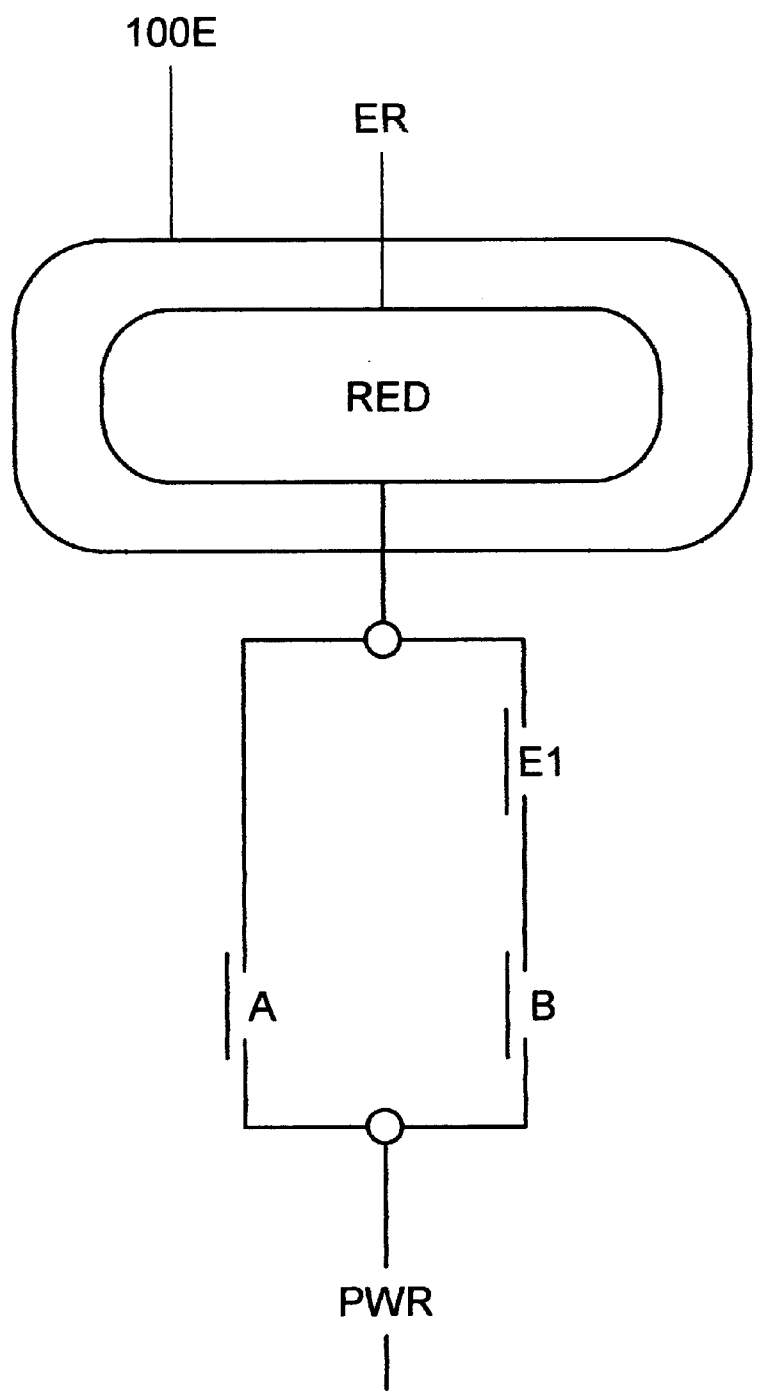

Referring now to FIGS. 4A–4E, possible designs of a visual warning device 100 and operating contacts are shown. To further aid in interpretation of the warning signal, the color of the warning signal 100 is preferably red, or amber, or a combination of both red and amber. FIGS. 4A–4E show five designs of visual warning devices, four of them having red and amber lights (FIGS. 4A–4D) and one having a single red light (FIG. 4E). The advantage of a particular design over another one is not discussed in the present invention.

In the disclosed embodiment of the invention, the highest warning intensity level (W4) is selected when high deceleration rates or overspinning of the wheels are experienced by the automobile V. For designs having red and amber lights, this level corresponds to activation, alternatively, of both the red and the amber lights. For high to medium-high deceleration rates, the high-intermediate warning intensity level (W3) is selected, which corresponds to activation of the red light(s) only. At medium to medium-low deceleration rates, the low-intermediate warning intensity level (W2) corresponds to activation of the amber light(s) only. It is contemplated that, when the high-intermediate and the low-intermediate warning intensity levels are selected, the warning signal can exhibit a full spectrum of blinking rates, each blinking rate corresponding to a specified deceleration rate of the automobile V. The lowest warning intensity level (W1) corresponds to continuous (no blinking) amber light (or red for the design of FIG. 4E). This level is selected when very low deceleration rates happen or when the automobile V is moving below a minimum speed. Finally, a neutral warning intensity level (W0) is selected during accelerations or cruising periods or when activation of a warning signal comes to an end.

Referring more particularly to FIG. 4A, the contact box 208A (an exemplary design of contact box 208) is comprised of six light selection contacts A1, A2, A3, A4, A5 and A6, for the selection of specified lights of the visual warning device 100A, and two light activation contacts A and B, for the activation, alternatively, of the selected lights of the visual warning device 100A. The contact box 208A is also comprised of ramifying of the line PWR that supplies the lights ALR, ALA, ARA and ARR of the visual warning device 100 with energy. The activation contacts A and B are disposed on the first level of the ramifying of the line PWR. The selection contacts are installed on the second level of the ramifying of the line PWR, between the activation contacts A and B and the visual warning device 100A. Such a disposition of the light selection contacts A, B, A1, A2, A3, A4, A5 and A6 allows the selection of different warning intensity levels (Wn) and the activation of the selected lights according to specified sequences. Description of these various warning signals in accordance with the design of the visual warning device 100 is provided in the following section.

Basic Operation of the Warning System

Briefly, a warning system according to the present invention operates in the following manner: at various intervals of time, the length of which depends upon the absolute speed of the automobile V, the microprocessor 204 queries each binary meter of a set of binary meters 202 to determine how many pulses have been counted since the binary meters 202 were last queried and zeroed—if more that one set of binary meters 202 are installed on the microprocessor card 102, each set of binary meters 202 is queried at a regular interval of time.

In this manner, the microprocessor 204 can determine a value representative of the speed of the automobile V. In the disclosed invention, this value is called a Pseudo-Speed Value. The microprocessor 204 utilizes this Pseudo-Speed Value and a previously stored value to determine an Intensity Value representative of a variation of the speed of the automobile V and the speed of the automobile. The microprocessor 204 then compares this Intensity Value to a plurality of discrete predetermined ranges of values to determine if the automobile V is decelerating and, if so, at what rate. If deceleration is detected, the comparison of the intensity value to a plurality of discrete predetermined ranges of values is followed by the selection of a warning intensity level (Wn). If no deceleration is detected or if a warning signal needs to be deactivated, the microprocessor 204 selects the neutral warning intensity level (W0).

Selection of a warning intensity level (Wn) corresponds to the selection, by the microprocessor 204 through the light selection contacts, of predetermined light colors, red and/or amber, of the visual warning device 100, and a sequence of activation of the selected colors.

This selection is followed by the calculation, by the microprocessor 204, of a frequency of activation (or Blinking Rate) of the selected light(s) of the visual warning device 100. The Blinking Rate is calculated from a formula using the last intensity value calculated. In this manner, within a predetermined range of values, the selected light(s) can exhibit a full spectrum of blinking rates, corresponding to a full spectrum of intensity value.

The flashing of the visual warning device 100 is provided by the microprocessor 204, by repeatedly closing and opening, alternatively and at the frequency calculated, the two activation contacts A and B in the contact box 208.

The process is then repeated at a rate that is a function of the last measured Pseudo-Speed Value of the automobile V, such that the deceleration of the automobile V is checked more frequently at higher speed levels.

All these variations in the warning signal and the frequency at which the deceleration of the automobile V is measured provide several advantages over prior art warning systems. The distance required for an automobile to stop is a function of both the reaction time of the driver in identifying a braking event before applying the brake pedal and the actual distance required for braking. The average reaction time for an individual typically ranges between three quarters of a second to a full second or more, depending on the physical and mental condition of the individual. The reaction time of an individual (and subsequently the distance required for slowing a vehicle down to a safe speed or to a fill stop) increases when a driver cannot immediately evaluate a dangerous situation or when he or she underestimates the situation due to lack of information sent from preceding vehicles.

For example, it is very easy for a driver to underestimate the urgency of a situation, particularly when the preceding vehicle has decelerated rapidly and its brake lights are no longer activated. This phenomenon can be observed in multi-car collisions—drivers at the end of such collisions often suffer much greater damage or physical injury than drivers at the head of such collisions.

Further, the actual distance required for braking following application of the brake pedal depends upon numerous physical factors. Such factors include the road conditions, the ambient weather conditions, the quality of the automobile's tires and shock absorbers, and the automobile's mass and speed—or inertia.

It is therefore desirable that, for a given rate of deceleration, the intensity of the warning signal generated by the automobile V be a function of the speed of the automobile V and the ambient driving conditions. It is further desirable that the intensity of the warning signal reflects the highest rate of deceleration that is measured within a given period of time.

In order to allow following drivers to respond more quickly to sudden deceleration of preceding vehicles at higher speeds, a warning system, according to the disclosed embodiment of the invention, is also capable of analyzing data at a rate that increases with the speed of the automobile V.

Referring now to FIGS. 5A–5D, operation of a warning system in accordance with the present invention is depicted. The following list summarizes various acronyms and variables used to describe operation of this warning system.

| VARIABLE | DESCRIPTION |
|---|---|
| BM | Binary Meter |
| GPC | Gas Pedal Contact |
| RB | Reset Button |
| A | Intensity value representative of a variation in the speed of an automobile at a given speed |
| B | Previous value of A |
| C | Number of cycles to be performed by the microprocessor in order to activate a warning signal for a given period of time |
| L, M | Factory-set variables used in the calculation of a blinking frequency |
| P | Total pulses read on a set of binary meters |
| R | Constant used in the calculation of the Pseudo-Speed Value |
| Sy | Value representative of a pseudo-speed |
| Sx | Previous Pseudo-Speed Value |
| T1, T2, T3 | Delays of a timer in Sy units of time between two readings of a set of binary meters |
| U, V | Variables representative of the duration of an ON/OFF state of two contacts |
| W | Delay of a timer in U or V units of time between the opening and the closing of two contacts |
| W0 | Neutral warning intensity level |
| W1, W2, W3, W4 | Active warning intensity levels |
| X | Preset standardization coefficient for wheels, gears and/or sensor |

-continued

| VARIABLE | DESCRIPTION |
|---|---|
| Y | Adjustment variable reflecting changes in ambient driving conditions |

Further, a1, a2, a3, a4, a5, k, l, m, n, r, s and x are variables having predetermined factory-set values such that a1<a2<a3<a4<a5 and k, l, m, n, r, s and x are greater than 0. a1, a2, a3, a4 and a5 are values of the variable A; k is used to adjust the value of C; l (the letter L non capital) is used to adjust the formulation A; m and n respectively are used to decrement the timer delays T1, T2, T3 and W by so many units of time per loop. Lastly, y(n) is a variable having a value determined by ambient road conditions such that y(n)>or=1.

Figure 5A:
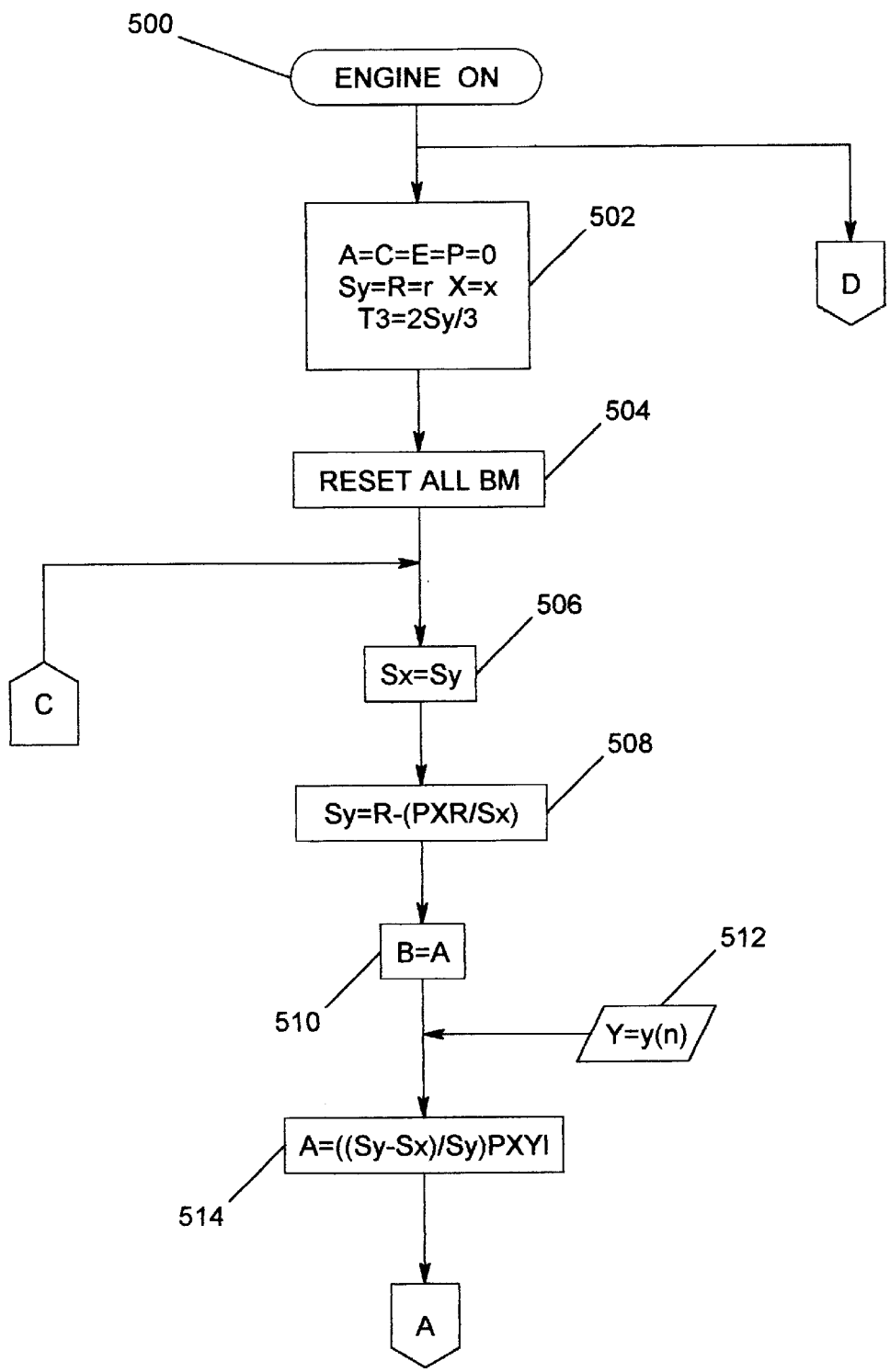

Referring to FIG. 5A, the Data Calculation of the warning system is described. The warning system commences operation when the engine is activated at step 500. Control proceeds to initialization step 502, and the intensity variable A, the cycle count variable C and the pulse count variable P are all initialized to zero. In addition, the pseudo-speed variable Sy and the constant R are initialized to r. Also, the timer delay variable T3 is given the value 2Sy/3. Further, the preset wheel and/or sensor standardization coefficient X is initialized to x. Variations in the preset wheel and/or sensor coefficient variable X are used to account for different sensor 104 types, or to standardize calculations based on different wheel, gear, or shaft sizes. Also after step 500, control proceeds to initialization step 588 in the Blinking Control section of the warning system (FIG. 5D), and the variables U and V are initialized to zero. After step 502, control passes to step 504, and each binary meter BM of a set of binary meters 202 is reset to zero.

Control passes to step 506, and the Pseudo-Speed Variable Sx is set equal to the Pseudo-Speed Variable Sy. As the speed of the automobile V increases, the value of Sy and, consequently, the value of Sx decrease, as will be seen below. Control then proceeds to step 508 for calculation of the pseudo-speed variable Sy from the formula R−(PXR/Sx). Control next proceeds to step 510, and the variable B is assigned a value equal to A.

At step 512, the warning system receives information regarding ambient road conditions. This information is reflected as variable Y. This ambient condition variable Y typically represents weather (precipitation, fog) and light (day, night) conditions. The variable Y is assigned a larger value as driving conditions deteriorate. Many types of sensors are suitable for measuring the ambient conditions. For example, the value of Y may depend upon activation of the vehicle's lights and/or windshield wipers and/or upon the sensing of rain drops and light intensity by rain and light sensors.

Control proceeds to step 514, and the intensity value A is calculated from the formula [(Sy−Sx)/Sy]PXY1.

Figure 5B:
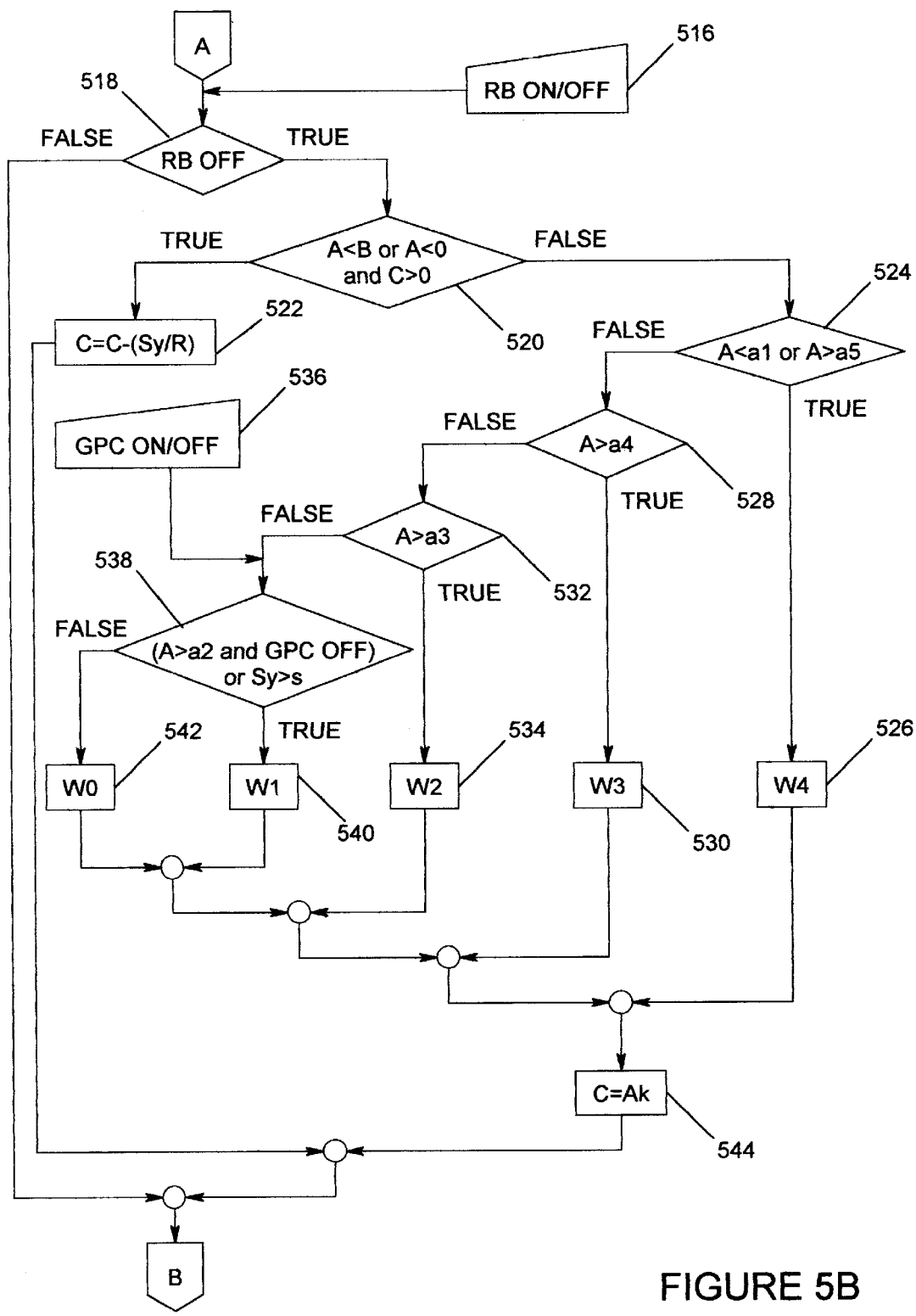

Referring now to FIG. 5B is the description of the Warning Selection of the warning system. At step 516 the ON/OFF state of the reset button 106 is retrieved. Control proceeds to step 518 to determine if the reset button 106 has been activated. If not, control passes to step 520 to determine if the intensity value A is less than its previous value B or less than zero and if the count variable C is greater than zero. If the conditions of step 520 are met, the count variable C (step 544) is recalculated in step 522 using the formula C=C−(Sy/R). If not, control proceeds to step 524 which is the beginning of the warning signal intensity level selection process. The variable A is compared against the factory-set values a1–a5 to determine if any warning signal should be sent.

In step 524, the intensity value A is first examined to determine if it is less than the predetermined minimum value a1, such as might be the case if the wheels of the automobile V experience a sudden and abnormal acceleration, for instance on a slippery surface, or greater than the predetermined maximum value a5, such as might be the case if the wheels of the automobile V are suddenly locked, for instance during a collision. In this event, control proceeds to step 526 and the highest warning signal W4 is selected. Operations following the selection of a warning signal W0, W1, W2, W3 or W4 are discussed more fully below.

If the variable A is not in the range specified by step 524, control proceeds to step 528, and the intensity value A is compared to a predetermined value a4. If A exceeds a4, control passes to step 530 and the warning signal W3 is selected. If A is not greater than a4, control passes to step 532 and the variable A is compared to a smaller predetermined value a3. If A is greater than a3, control passes to step 534 and the warning signal W2 is selected.

In step 536, the gas pedal contact 108 communicates an ON signal to the microprocessor 204 whenever the driver applies pressure to the gas pedal 108$a$, and communicates an OFF signal when no pressure is sensed on the gas pedal 108$a$. The gas pedal contact signal is examined in step 538, which is also where control proceeds if A is not greater than a3 as determined in step 532. In step 538, if A is greater than a2 and the gas pedal contact is off (GPC=OFF), or if Sy>s, control proceeds to step 540 and the warning signal W1 is selected. The term Sy>s allows the warning W1 to be selected in situations where the automobile V is moving at a slow rate of speed, but not stopped.

As can be seen, the warning signal W1 can also be selected by the microprocessor 204 during periods of very slight deceleration rates if no pressure is applied on the gas pedal 108A. Theses slight deceleration rates may occur as the result of a complete release of pressure from the gas pedal 108A when a driver begins a speed reduction or when a driver hesitates. The function of the warning signal W1 is to inform following drivers of the possibility of an impending braking event and subsequent sudden reduction in the speed of the automobile V, even before pressure is applied to the brake pedal. By warning other drivers of impending braking events, the following drivers' reaction time and required stopping distance can be substantially reduced. Since C=Ak (step 544) and A is very close to 0, W1 is typically activated for only short periods of time.

As long as pressure is being applied to the gas pedal (GPC=ON), the very slight speed reductions of the automobile V are not taken into account by the microprocessor 204 and no warning signal is sent. If the conditions of step 538 are not met, control proceeds to step 542 and the neutral warning signal W0 is selected, which means no warning signal is sent.

Control proceeds to step 544 and the count variable C (further used to determine the duration of a warning signal) is set equal to Ak.

The count variable C represents a number of cycles to be performed after activation of a warning signal, after which the visual warning device 100 is typically deactivated. The use of a variable count C is advantageous for a number of reasons: since the value of the variable A (times k) is assigned to C, the count variable C allows the warning signal corresponding to the highest intensity value A to be activated for a period of time that increases as A increases. Thus, a high intensity warning signal can remain activated for a fair amount of time, even after the automobile V has come to an abrupt stop and the brake lights are no longer activated. This feature of the disclosed embodiment of the invention allows drivers rounding a curve, for example, to determine that potentially dangerous conditions exist ahead and that abrupt action may be required. When speed reductions are less dramatic (lower values of A), the warning signal is held for a shorter period of time. As can be seen at steps 544 and 520, the count variable C is reset each time a higher or equivalent rate of deceleration is detected.

The following factors should be considered in vehicular warning systems.

1. The faster a mass is traveling, the longer it takes to slow it down, in both time and distance. Consequently, when an automobile is decelerating at high speeds, it is desirable to send a more intense warning signal level to the following drivers than that sent for a similar deceleration intensity but at lower speeds.

2. For a given braking intensity, as an automobile slows down, its deceleration rate, as compared to its speed increases and vice versa. Suppose the deceleration rate is expressed as a percentage of lost units of speed per unit of time: as the automobile slows to a complete stop, the percentage of lost speed approaches one hundred per cent of the speed of the automobile. Example: from 50 MPH down to 40 MPH in one second, an automobile has lost 20% of its initial speed before deceleration. From 10 MPH down to a complete stop, the automobile has lost 100% of its initial speed in one second. In both cases, the rate of deceleration is the same: 10 MPH in one second. Consequently, if the absolute speed was not taken into account in the sending of a warning signal, the warning signal intensity, according to the present invention might be higher or lower than desirable for a given deceleration rate. For example, the warning signal intensity might be unnecessarily high in response to strong deceleration rates in less dangerous situations such as slow city traffic where the masses of the automobiles have little inertia and the drivers are aware of the constant speed variations of the traffic. Conversely, the warning signal intensity might be lower than desirable in response to relatively low rates of deceleration in potentially dangerous situations, such as high speed interstate traffic where the masses of the automobiles have much greater inertia and drivers may not be ready to react in time when a sudden speed reduction happens.

3. Driving conditions such as weather and light are considered an important factor in traffic safety. Bad weather (rain, snow or fog), as well as poor light have a negative impact on traffic and require more attention from the drivers. Consequently, for a given deceleration rate, the intensity of the warning signal should be higher to reflect deteriorating driving conditions.

In the disclosed embodiment of the invention, factors such as the inertia and the deceleration rate of the automobile V, and the driving conditions are taken into account in the formulation of a Pseudo-Speed Value Sy and an Intensity Value A. Use of the constant R in the calculation of Sy (step 508) and the product PX in the calculation of A (step 514) causes A to increase as the speed of the automobile V increases. Also, the ratio R/Sx in the calculation of Sy (step 508) accentuates this increase of A as the speed of the automobile V increases. Finally, the variable Y in the calculation of A (step 514) increases A when ambient weather/light conditions have a greater impact on braking distance. Like the Intensity Value A, the intensity of the warning signal selected is related to the absolute speed and the rate of deceleration of the automobile V, and the ambient driving conditions.

In the disclosed embodiment of the invention, variations in wheel sizes and sensor 104 configurations are accounted for by use of the preset wheel and/or sensor standardization coefficient X in the formula for the calculation of Sy and A. In effect, the factory-set value of the standardization coefficient X increases or decreases the number of pulses P read from the binary meters of a set of binary meters 202 as necessary to achieve consistent results in automobiles having mechanical differences.

Figure 5C:
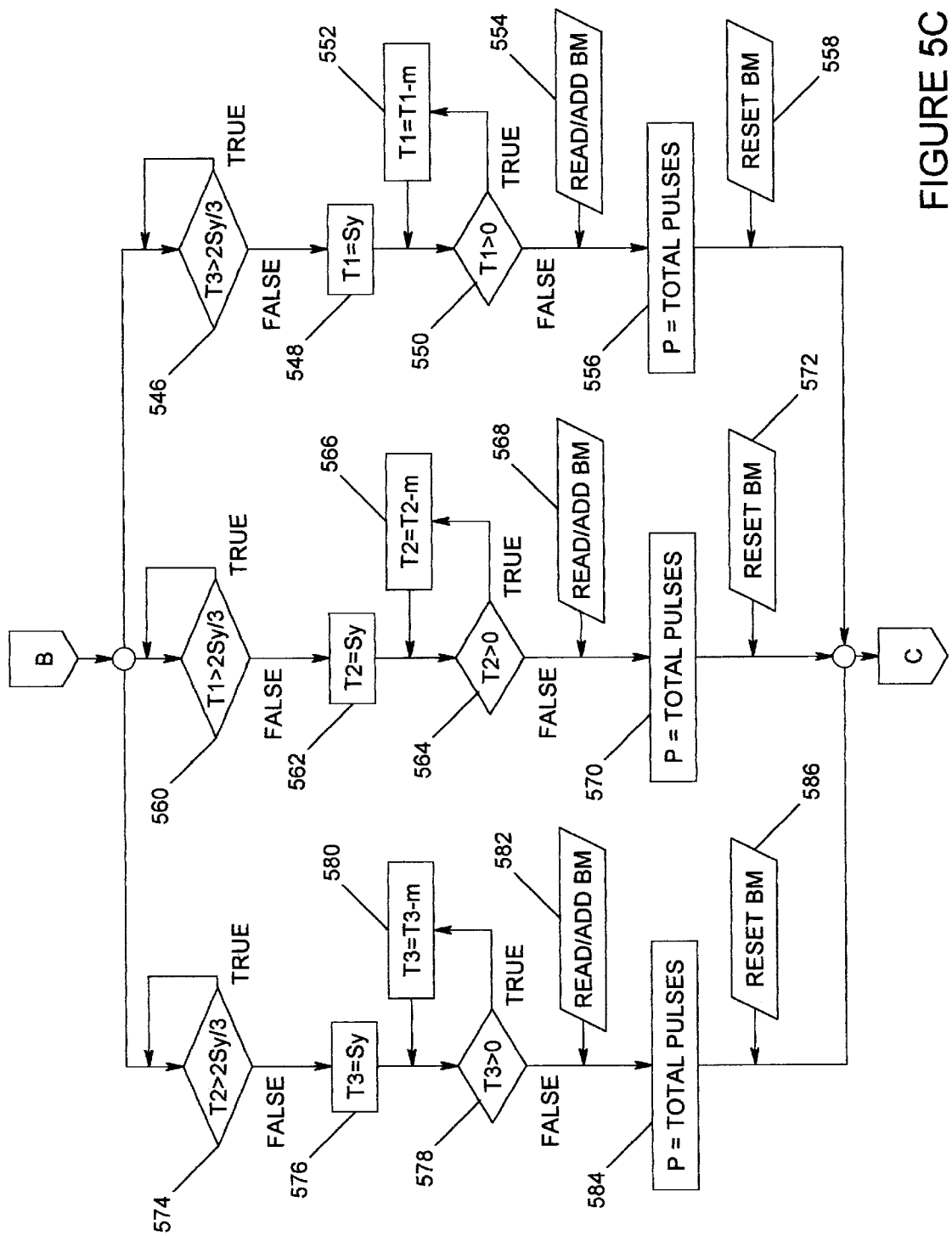

In FIG. 5C, the Speed Evaluation of the warning system is explained. Following step 544, control passes to steps 546, 560 and 574, which is also where control passes after the count variable C is decreased by Sy/R at step 522 or if the reset button 106 is activated as determined in step 518. In the disclosed embodiment of the invention, three Speed Evaluation units are shown. Each unit is coupled to a set of binary meters 202.

Steps 546, 560 and 574 are temporizers. Their purpose is to regulate the access to a Speed Evaluation unit so that each unit is being processed at a regular interval of time. The control can have access to a unit only when the timer delay variable T(n) of the preceding unit is equal to or less than two thirds of its initial value Sy. This way, if the control is "late" to access to a unit, ("late" meaning that the value T(n) of the preceding unit is not any more greater than 2Sy/3), the corresponding temporizer allows the control to pass with no delay. If the control is too "early" to access to a unit, ("early" meaning that the value T(n) of the preceding unit is still greater than 2Sy/3), the corresponding temporizer holds it until the value T(n) equals or is less than 2Sy/3.

The rate at which the control performs one complete cycle of the program—Data Calculation plus Warning Selection plus Speed Evaluation—equals the value Sy of a timer delay T(n), divided by the number of Speed Evaluation units installed in the system. Thus, with three Speed Evaluation units, one complete cycle is processed every Sy/3 units of time. Having n Speed Evaluation units installed makes the warning system n times more responsive. In the same time, each binary meter of a set of binary meters 202 can still run during Sy units of time (instead of Sy/3 units of time) before it is reset to zero, which allows the pulse count P, the pseudo-speed Sy and the intensity value A to have more significant values, especially at low vehicle's speed.

Further, the duration of each cycle (i.e., the value Sy of a timer delay variable T(n)) decreases as the speed of the automobile V increases, allowing faster response time to new data to be achieved at higher speeds. Shorter cycle times at higher speeds also allows the system to control the number of bits implementing each binary meter of a set of binary meters 202.

In step 548, the timer delay variable T1 is set equal to the value last calculated Sy. T1 determines the amount of time between two different readings of a specified set of binary meters 202. Then control passes to step 550, and the value of T1 is tested. If T1 is greater than zero, control passes to step 552, and T1 is decreased by m. Then T1 is tested again in step 550. If T1 is still greater than zero, control loops back to step 552, and again T1 is decreased by m. Control loops until T1 is less than or equal to zero. Each timer process requires a specified amount of time. For example, if one loop requires 1 millisecond to perform and T(n) is initialized to Sy=600, completion of the timer delay to reach T(n) less than or equal to zero requires 600 milliseconds.

When T(n) is less than or equal to zero, control proceeds to step 554 and the microprocessor 204 reads and adds all the binary meters of a specified set of binary meters 202. Control proceeds to step 556, and the variable P is assigned the value of the last pulse count read from the specified set of binary meters 202. Control proceeds to step 558, and each binary meter of the specified set of binary meters 202 is reset to zero.

Control performs an identical series of operations for each Speed Evaluation unit (from step 560 to step 572 in the second unit, and from step 574 to step 586 in the third unit). At the end of each Speed Evaluation section—after either step 558, 572 or 586—control returns to step 506 to start a new cycle.

Finally, referring to FIG. 5D is the description of the Blinking Control section of the warning system. In order for the warning signal to flash or blink, the microprocessor 204 repeatedly open and close, alternatively, the two activation contacts A and B in the contact box 208. This operation is done at the rate determined by the microprocessor 204 when a warning intensity level (Wn) is selected.

At step 588, the variables U and V are initialized to zero. At step 590, the activation contact B in the contact box 208 is opened. Control passes to step 592, and the activation contact A in the contact box 208 is shut. Control proceeds to step 594, and the value U is queried in the memory 206 and assigned to the timer delay W. Control proceeds to step 596, and W is tested. If W is greater than 0, control proceeds to step 598, and the timer delay W is decreased by n. Again W is tested in step 596, and decreased by n at step 598. Control loops until W is less than or equal to zero.

When W is less than or equal to zero, control proceeds to step 600, and the shut/open state of the light activation contact A is tested. If the contact is shut, control proceeds to step 602, and the activation contact A is opened. At step 604, the light activation contact B is shut. Control proceeds to step 606, and the microprocessor queries the value V in the memory 206 and assigns it to the timer delay W. Then control proceeds again to steps 596, and then again to step 598. The system loops until W is less than or equal to zero. Again, at step 600, the shut/open state of the activation contact A is tested. If the light activation contact A is open, control proceeds to step 590, and a new cycle is started.

As seen in FIG. 5B, a warning intensity level (Wn) is selected after comparison of an Intensity Value A to a plurality of predetermined ranges of values. W4 is selected as the emergency warning when A<a1 or A>a5; W3 is selected when A>a4 and A$\leq$a5; further, W2 is selected when A>a3 and A$\leq$a4; W1 is selected when (A>a2 and A$\leq$a3 and GPC OFF) or Sy>s; finally W0 is selected when (A$\geq$a1 and A$\leq$a2) or (A>a2 and A$\leq$a3 and GPC ON) or Sy$\leq$s. Each warning selection corresponds to specified operations realized by the microprocessor 204. These operations are described below with warning level W4 taken as an example.

The selection of W4 consists in the following simultaneous operations:

1-hazards and reset button are turned ON.

2-A=MaxA: If the flashing of the selected light(s) is too fast, it may not be perceptible by the human eye. In order to control the blinking rate when A>a5 or to avoid having an inadequate blinking rate and C=Ak a negative value (step 544) as a result of A<a1 (A negative value), the microprocessor 204 limits the intensity value A to a maximum value: MaxA.

3-contact setting: the microprocessor 204 sets the light selection contacts of the visual warning device 100 in the contact box 208, such that both red and amber lights flash or blink alternatively—except for visual warning device 100E of FIG. 4E which has a single red light ER. For visual warning device 100A of FIG. 4A, the red light ALR is activated at the same time than the amber light ARA and the red light ARR is activated at the same time than the amber light ALA. To obtain this particular sequence of activation of the selected lights, the selection contacts are set as shown below.

| Figure | Selection contacts | Selected light(s) |
|---|---|---|
| 4A | A1, A3, A4, A6 ON<br>A2, A5 OFF | ALR, ALA, ARA, ARR |
| 4B | B1, B3 ON<br>B2 OFF | BLR, BA, BRR |
| 4C | C1, C3 ON<br>C2 OFF | CR, CA |
| 4D | D1, D3, D4 ON<br>D2, D5 OFF | DLR, DA, DRR |
| 4E | E1 OFF | ER |

4-calculation of a blinking rate: when W4 is selected, both red and amber light(s) may flash alternatively to better attract people's attention (see FIGS. 4A, 4B, 4C and 4D). U represents the duration of the phase "activation contact A shut-activation contact B open" (or "A ON-B OFF") and V represents the duration of the phase "activation contact A open-activation contact B shut" (or "A OFF-B ON"). Like T(n) in the Speed Evaluation section (FIG. 5C), W represents the delay of a timer in units of time. L is a factory-set value such that L>A. If U=V=L-A, then both phases "A ON-B OFF" and "A OFF-B ON" have the same duration. Since A=MaxA, U and V are constant and so is the duration W. When the warning levels W3 and W2 are selected, increases of A cause U and V to decrease and the blinking rate to be faster.

The following table shows different contact settings, light selection and blinking rates for a given warning intensity level (Wn) and design of the visual warning device 100. For a easier understanding, it is recommended to read the table in conjunction with FIGS. 4A–4E.

| Range of values | Warning level | Figure | Blinking rate | Light Contact | Selected Lights |
|---|---|---|---|---|---|
| A<a1 or A>a5 | W4<br>Hazards and RB ON<br>A=MaxA | 4A | U=V=L-A | A1, A3, A4, A6 ON<br>A2, A5 OFF | ALR, ALA, ARA, ARR |
| | | 4B | U=L-A<br>V=MinV | B1, B3 ON<br>B2 OFF | BLR, BA, BRR |
| | | 4C | U=L-A<br>V=MinV | C1, C3 ON<br>C2 OFF | CR, CA |
| | | 4D | U=L-A<br>V=MinV | D1, D3, D4 ON<br>D2, D5 OFF | DLR, DA, DRR |
| | | 4E | U=L-A<br>V=MinV | E1 OFF | ER |
| A>a4 | W3 | 4A | U=V=L-A | A1, A6 ON<br>A2, A3, A4, A5 OFF | ALR, ARR |
| | | 4B | U=L-A<br>V=MinV | B1 ON<br>B2, B3 OFF | BLR, BRR |
| | | 4C | U=L-A<br>V=MinV | C1 ON<br>C2, C3 OFF | CR |
| | | 4D | U=V=L-A | D1, D5 ON<br>D2, D3, D4 OFF | DLR, DRR |
| | | 4E | U=L-A<br>V=MinV | E1 OFF | ER |
| A>a3 | W2 | 4A | U=V=M-A | A3, A4 ON<br>A1, A2, A5, A6 OFF | ALA, ARA |
| | | 4B | U=M-A<br>V=MinV | B2 ON<br>B1, B3 OFF | BA |
| | | 4C | U=M-A<br>V=MinV | C2 ON<br>C1, C3 OFF | CA |
| | | 4D | U=M-A<br>V=MinV | D2 ON<br>D1, D3, D4, D5 OFF | DA |
| | | 4E | U=L-A<br>V=MinV | E1 OFF | ER |
| (A>a2 and GPC OFF) or Sy>s | W1 | 4A | U=V=MinV | A2, A3, A4, A5 ON<br>A1, A6 OFF | ALA, ARA |
| | | 4B | U=V=MinV | B2, B3 ON<br>B1 OFF | BA |
| | | 4C | U=V=MinV | C2, C3 ON<br>C1 OFF | CA |
| | | 4D | U=V=MinV | D2, D3 ON<br>D1, D4, D5 OFF | DA |
| | | 4E | U=V=MinV | E1 ON | ER |
| A<a2 or (A>a2 and GPC ON) or A≦A1 or Sy≦s | W0 | All figures | U=V=0 | All contacts OFF | No light signal |

The use of different variables L and M for the calculation of a blinking rate depends on the warning signal selected. FIG. 4C is taken as an example. During a gentle deceleration, A>a3 and A≦a4 such that W2 is selected. Only the amber light CA blinks and does so at a slow rate. Since the blinking rate is related to the Intensity Value A, increases of A cause the amber light CA to blink at an increasing rate. When A>a4 and A≦a5, W3 is selected. The amber light CA is replaced by the red light CR.

Just before it is turned off, the amber light CA blinks at a fairly fast rate. In order to have the red light CR started at a slower blinking rate that the maximum blinking rate of the amber light CA, the formula for the calculation of U uses two different factory-set variables L and M, one for the red light CR (variable L) and one for the amber light CA (variable M), with L>M>A.

Although the blinking rate has decreased when the red light CR replaced the amber light CA, the warning signal indicates an increase in the deceleration rate, precisely because the color of the light is now red instead of amber. The fast blinking of an amber light is perceived as less an intense warning signal than a red light blinking at a slower rate.

This overlaping of two sprectrums of blinking rates does not apply to visual warning device 100E in FIG. 4E. Since there is no amber light in this design, the blinking rates show a steady increase with the increases of A. For this simple design: U=L−A.

When W0 is selected, the microprocessor 204 keeps opening and closing, alternatively, the two activation contacts A and B in the contact box 208 but, because all the light selection contacts are open, no warning signal is exhibited. Also, with U+V=0, the phases "A ON-B OFF" and "A OFF-B ON" have no duration.

When A increases within a predetermined range of values (with the same warning intensity level selected), the faster blinking rate should show instantly. Since the microprocessor 204 constantly queries new values of U and V for the timer delay W (FIG. 5D), the maximum delay before the warning signal effectively exhibits a faster blinking rate is the sum of the two, last calculated values U and V. To keep this response time as low as possible, it may be interesting to keep V small and constant. For that, V is given a minimum value MinV. For the same reason, U+V=0 (W0) allows the warning system to respond faster when a deceleration is detected.

The five drawings presented in FIGS. 4A–4E only focus on the technical aspects of some possible designs of visual warning devices, such as the number of red and amber lights, their position relative to each other and the set of contacts necessary to obtain different light combinations and sequences of activation. Those skilled in the art will of course envision variations on these possible designs and these variations are within the scope of the invention. In the following paragraphs, a description of these Figures is provided along with the different selections and sequences of activation of the warning lights, in response to specified warning intensity levels.

The visual warning device 100A (FIG. 4A) is comprised of one red light ARR on the right and one red light ALR on the left. Between the two red lights are two amber lights ARA and ALA. Six selection contacts (A1–A6) are necessary to obtain the desired light selection and sequence of activation corresponding to the warning level selected. The two light activation contacts A and B, common to all Figures, allow the flashing of the lights.

W4-in an emergency situation, the red light ALR and the amber light ARA are activated together and alternatively with the red light ARR and the amber light ALA. Since U=V, each couple of lights is activated for the same duration W.

W3-the red light ALR flashes alternatively with the red light ARR. There too, each light is activated for the same duration W. The two amber lights ALA and ARA remain off.

W2-the amber light ARA is activated alternatively with the amber light ALA and for the same duration W. The two red lights ALR and ARR remain off.

W1-both amber lights ALA and ARA are activated continuously.

In FIG. 4B, the visual warning device 100B has two red lights BRR and BLR. Between the two red lights is one amber light BA. Three contacts are used.

W4-the light selection is such that both red lights BLR and BRR are activated together and they flash alternatively with the amber light BA. Since U=V, both activation phases last a same amount of time.

W3-both red lights BLR and BRR are activated together and alternatively with a no-light phase. Since U>V, the activation phase last longer. The amber light BA remains OFF.

W2-the amber light BA is activated alternatively with a no-light phase. There too, with U>V, the activation phase last longer. Both red lights BLR and BRR are deactivated.

W1-the amber light BA is continuous.

In FIG. 4C, the visual warning device 100C has one red light CR above one amber light CA. As with the device in FIG. 4B, three contacts are built to obtain the desired light combination and sequence for a given warning intensity level.

W4-in an emergency situation, the red light CR is activated alternatively with the amber light CA. Each activation phase has the same duration W.

W3-In this case, only the red light CR is blinking. Since U>V, the activation phase lasts longer. The amber light CA remains off.

W2-the amber light CA blinks alone. There too, U>V. The red light CR remains off.

W1-the light selection causes the amber light CA to be continuous.

In FIG. 4D, the visual warning device 100D is comprised of one red light DRR installed on the right and one red light DLR installed on the left. Between the two red lights is one amber light DA. Five contacts are necessary to obtain the desired light selection and sequence corresponding to each warning level selected.

W4-for emergency, the contact setting of this design is such that both red lights DLR and DRR are flashing together and alternatively with the amber light DA. With U=V, both phases have the same duration W.

W3-the red light DLR is activated alternately with the red light DRR and for a same amount of time. The amber light DA remains off.

W2-the amber light DA flashes alone and its phase on lasts longer than its phase off. Both red lights DLR and DRR are turned off.

W1-with this warning level, the amber light DA is continuous.

Finally in FIG. 4E, with only one red light ER and no amber light, the visual warning device 100E has the simplest design. Only one contact is necessary to operate the light ER.

W4, W3 and W2-the red light ER flashes.

W1-the red light ER is continuous.

A concrete example of this description is given with situations. In this example, L=600, M=400 and V=MinV= 200. The visual warning device is that one of FIG. 4B.

After comparison, the pseudo-acceleration/deceleration value A is found to belong to the range of values where A>a3 and A<or=a4 so the microprocessor 204 selects the warning signal level W2. According to the table seen above, if A=80, U=M−A=320. The light selection contact B2 is shut and the contacts B1 and B3 are open. The amber light BA is on for W=U units of time and off for W=V units of time. If U and V are a number of milliseconds, then the amber light BA blinks at a rate of 320 ms on and 200 ms off.

Further, still in the same predetermined range of values, A increases such that A=95. Again W2 is selected by the microprocessor 204 but this time, U—M-A=305. With this increased deceleration rate, the light selection remains the same but the amber light BA blinks at a faster rate of 305 ms on and 200 ms off.

If the deceleration rate increases to the point where A>a4 and A<or=a5, the microprocessor 204 selects the warning signal W3. If A=125, U=L−A=475. When W3 is selected, the amber light BA gives the relay to the two red lights BLR and BRR. To obtain this new light selection, the contact B1 is shut and the contacts B2 and B3 are open. The red lights BLR and BRR are activated together for 475 ms. They are deactivated for 200 ms. The blinking rate is slower than the previous blinking rate calculated for the amber light.

Once the count down is over (step 520), if no new deceleration is experienced but the speed of the automobile V is such that Sy>s, then W1 is selected. With this selection, U=V=MinV and the amber light BA is activated during both phases. The transition between the two phases—with one contact (A or B) being opened before the other contact is shut—is so fast that no blinking of the light can be perceived by the human eye—the amber light BA appears continuous.

Finally, the automobile V is now cruising at normal speed such that Sy<or=s. W0 is selected. All the selection contacts in the contact box are opened and U+V=0. Yet, the microprocessor 204 continues to repeatedly close and open, alternatively, the two activation contacts A and B, but it has no effects on the visual warning device 100.

Thus, a passive warning system capable of instantly communicating vehicular deceleration and other emergency information has been described. A microprocessor-based warning system according to the invention accounts for variations in vehicular speed in generating a visual warning signal having an intensity and a blinking rate related to the rate of deceleration, the speed of the vehicle and the ambient driving conditions. The warning system is also increasingly responsive as the speed of the automobile increases, allowing deceleration information to be communicated within a shorter period of time at higher speeds.

In one embodiment of the invention, the microprocessor is also programmed to keep the highest warning signal activated for a given period of time in order to inform vehicles arriving in the vicinity of a sudden speed reduction of the possibility that hazardous traffic conditions still exist.

Further, a warning system according to the invention can be configured to communicate a high intensity warning signal if the wheels of the vehicle become suddenly blocked as might occur during a collision, or rotate at a rate that is disproportionate to the speed of the vehicle, as might occur during icy driving conditions. Various other embodiments of the invention have also been described.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A warning system for use in an automobile, the warning system communicating a warning signal of variable warning intensity levels in response to specified deceleration rates experienced by the automobile, comprising:

(1) a sensor for gathering information related to the speed of the automobile;

(2) a visual warning device capable of displaying warning signals of varying warning intensity levels;

(3) a microprocessor coupled to said sensor and said visual warning device;

(4) A said microprocessor programmed to repeatedly perform the steps of:

(i) retrieving, from said sensor, the information related to the speed of the automobile;

(ii) utilizing the information related to the speed of the automobile over time to calculate an intensity value representative of the variation in speed being experienced by the automobile and the speed of the automobile;

(iii) comparing said intensity value to at least one of a plurality of predetermined ranges of values; and (iv) activating said visual warning device at one of a plurality of warning intensity levels if said intensity value is within a corresponding range of values.

2. The warning system of claim 1, wherein said microprocessor performs said step of retrieving information related to the speed of the automobile at an increasing frequency as the speed of the automobile increases.

3. The warning system of claim 1, wherein said microprocessor, prior to comparing said intensity value to at least one of a plurality of predetermined ranges of values, performs the step of adjusting said intensity value according to a value representing ambient driving conditions, such that said visual warning device is activated at a higher warning intensity level in response to deteriorating ambient driving conditions.

4. The warning system of claim 3, wherein said automobile incorporates windshield wipers, and wherein said value representing ambient driving conditions is adjusted in response to activation of the windshield wipers.

5. The warning system of claim 3, wherein said automobile incorporates headlights, and wherein said value representing ambient driving conditions is adjusted in response to activation of the headlights.

6. The warning system of claim 1, wherein said visual warning device is at least one light.

7. The warning system of claim 6, wherein said visual warning device is comprised of at least one red light.

8. The warning system of claim 6, wherein said visual warning device is comprised of at least one red light and at least one amber light.

9. The warning system of claim 6, wherein said step of activating said visual warning device at a predetermined one of said plurality of warning intensity levels comprises:

(1) selecting at least one light of said visual warning device, such that said visual warning device displays a higher warning alarm signal intensity in response to increases in said intensity values; and (2) calculating a value representative of a frequency of activation of said at least one light, such that said at least one light flashes at an increasing rate in response to increases in said intensity value.

10. The warning system of claim 9, wherein said frequency of activation is given a predetermined value when said visual warning device is activated at a predetermined one of said plurality of warning intensity levels.

11. The warning system of claim 1, wherein, at a given speed of the automobile, higher intensity values correspond to higher deceleration rates experienced by the automobile, and wherein, at a given deceleration rate experienced by the automobile, higher intensity values correspond to higher speeds of the automobile.

12. The warning system of claim 1, wherein said sensor comprises:
   (1) at least one fixed magnet;
   (2) a rotating part disposed within the automobile such that said rotating part rotates relative to motion of the automobile;
   (3) at least one rotating magnet coupled to said sensor rotating part; and
   (4) said at least one fixed magnet, said rotating part and said at least one rotating magnet being spatially arranged such that rotation of said rotating part causes said at least one rotating magnet to pass with sufficient proximity to said at least one fixed magnet to induce an electrical pulse, the speed of the automobile being determined by the number of such pulses in a given amount of time.

13. The warning system of claim 12, further comprising at least one binary meter, wherein said electrical pulses generated by said sensor are received by said at least one binary meter for provision to said microprocessor.

14. The warning system of claim 1, wherein the automobile incorporates a gas pedal, further comprising:
   a gas pedal contact, said gas pedal contact being adapted for generating a gas pedal electrical signal indicating that pressure is being applied to the gas pedal, wherein for predetermined intensity values said visual warning device is activated if said gas pedal electrical signal is absent, said visual warning device being deactivated if said gas pedal signal is present.

15. The warning system of claim 1, further comprising:
   a reset button, wherein said reset button must be actuated in order to deactivate said visual warning device following activation of said visual warning device at a predetermined warning intensity level.

16. The warning system of claim 1, said automobile further incorporating hazard lights, wherein said step of activating said visual warning device at said one of said plurality of warning intensity levels further comprises activating the hazard lights when said visual warning device is activated at a predetermined warning intensity level.

17. The warning system of claim 1, wherein said intensity value is given a predetermined value when said visual warning device is activated at a predetermined warning intensity level.

18. The warning system of claim 1, wherein said step of activating said visual warning device at one of said plurality of warning intensity levels further comprises maintaining said visual warning device activated at an identical warning intensity level for a predetermined period of time, said predetermined period of time increasing proportionately to increases in said intensity value.

19. The warning system of claim 18, wherein a new predetermined period of time is started if an equal or higher intensity value is determined before expiration of an immediately subsequent predetermined period.

20. The warning system of claim 1, wherein said step of activating said visual warning device at said one of said plurality of warning intensity levels further comprises activating said visual warning device at a predetermined warning intensity level if the wheels of said automobile rotate at a rate that is disproportionate to the speed of the automobile.

21. The warning system of claim 1, wherein said step of activating said visual warning device at said one of said plurality of warning intensity levels further comprises activating said visual warning device at a predetermined warning intensity level if the speed of the automobile falls below a predetermined value.

22. A method of communicating an automotive warning signal of variable warning intensity levels in response to specified deceleration rates experienced by an automobile, said automobile incorporating at least one visual warning device, said method comprising the steps of:
   (1) gathering information related to the speed of the automobile over time;
   (2) utilizing said speed information to calculate an intensity value representative of both the rate of deceleration being experienced by the automobile and the speed of the automobile;
   (3) comparing said intensity value to at least one of a plurality of predetermined ranges of values; and
   (4) activating said visual warning device at said one of said plurality of warning intensity levels if or when said intensity value is within a corresponding predetermined range of intensity values, wherein higher warning intensity levels correspond to more significant values that lower warning intensity levels.

23. The method of claim 22, wherein said step of gathering said information is performed more frequently as the speed of said automobile increases.

24. The method of claim 22, wherein said step of activating said visual warning device at said one of said plurality of warning intensity levels further comprises maintaining said visual warning device activated at an identical warning intensity level for a predetermined period, said predetermined period of time increasing proportionately to increases in said intensity value.

25. The warning system of claim 24, wherein a new predetermined period is started if an equal or higher intensity value is determined before expiration of an immediately subsequent predetermined period.

26. The method of claim 22, further comprising the step of adjusting the intensity value according to a value representing ambient driving conditions.

* * * * *